United States Patent
Du et al.

(10) Patent No.: US 12,086,996 B2
(45) Date of Patent: Sep. 10, 2024

(54) ON-VEHICLE SPATIAL MONITORING SYSTEM

(71) Applicant: GM GLOBAL TECHNOLOGY OPERATIONS LLC, Detroit, MI (US)

(72) Inventors: Xinyu Du, Oakland Township, MI (US); Yao Hu, Sterling Heights, MI (US); Binbin Li, College Station, TX (US); Hao Yu, Troy, MI (US); Wende Zhang, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 17/567,365

(22) Filed: Jan. 3, 2022

(65) Prior Publication Data

US 2023/0215026 A1 Jul. 6, 2023

(51) Int. Cl.
*G06T 7/00* (2017.01)
*B60W 10/04* (2006.01)
(Continued)

(52) U.S. Cl.
CPC .............. *G06T 7/33* (2017.01); *B60W 10/04* (2013.01); *B60W 10/18* (2013.01); *B60W 10/20* (2013.01);
(Continued)

(58) Field of Classification Search
CPC .............. G06T 7/33; G06T 7/55; G06T 7/80; G06T 2207/10028; G06T 2207/20212;
(Continued)

(56) References Cited

U.S. PATENT DOCUMENTS

| 11,455,806 B2 * | 9/2022 | Gummadi | G06V 10/7715 |
| 2014/0067206 A1 * | 3/2014 | Pflug | B60T 7/22 701/41 |

(Continued)

FOREIGN PATENT DOCUMENTS

| CN | 102248947 A | * | 11/2011 | ............. G01S 17/42 |
| CN | 111862673 B | * | 10/2021 | ......... G06K 9/00812 |

(Continued)

OTHER PUBLICATIONS

Liu, YC et al. Bird's-Eye View Vision System for Vehicle Surrounding Monitoring. In: Sommer, G., Klette, R. (eds) Robot Vision. RobVis 2008. Lecture Notes in Computer Science, vol. 4931, pp. 207-218 [online], [retrieved on Mar. 6, 2024]. Retrieved at <URL: https://doi.org/10.1007/978-3-540-78157-8_16> (Year: 2008).*

(Continued)

*Primary Examiner* — Peter D Nolan
*Assistant Examiner* — Peter Y Ning
(74) *Attorney, Agent, or Firm* — Quinn IP Law

(57) ABSTRACT

A vehicle control system including a spatial monitoring system includes on-vehicle cameras that capture images, from which are recovered a plurality of three-dimensional points. A left ground plane normal vector is determined for a left image, a center ground plane normal vector is determined for a front image, and a right ground plane normal vector is determined for a right image. A first angle difference between the left ground plane normal vector and the center ground plane normal vector is determined, and a second angle difference between the right ground plane normal vector and the center ground plane normal vector is determined. An uneven ground surface is determined based upon one of the first angle difference or the second angle difference, and an alignment compensation factor for the left (Continued)

camera or the right camera is determined. A bird's eye view image is determined based upon the alignment compensation factor.

20 Claims, 8 Drawing Sheets

(51) Int. Cl.

| | |
|---|---|
| *B60W 10/18* | (2012.01) |
| *B60W 10/20* | (2006.01) |
| *G01S 17/89* | (2020.01) |
| *G01S 17/931* | (2020.01) |
| *G06T 7/246* | (2017.01) |
| *G06T 7/33* | (2017.01) |
| *G06T 7/55* | (2017.01) |
| *G06T 7/80* | (2017.01) |
| *G06V 20/56* | (2022.01) |
| *H04N 5/262* | (2006.01) |
| *H04N 23/90* | (2023.01) |

(52) U.S. Cl.
CPC ............ *G01S 17/89* (2013.01); *G01S 17/931* (2020.01); *G06T 7/246* (2017.01); *G06T 7/55* (2017.01); *G06T 7/80* (2017.01); *G06V 20/56* (2022.01); *H04N 5/2625* (2013.01); *H04N 23/90* (2023.01); *B60W 2420/403* (2013.01); *B60W 2420/408* (2024.01); *B60W 2552/35* (2020.02); *G06T 2207/10028* (2013.01); *G06T 2207/20212* (2013.01); *G06T 2207/30252* (2013.01)

(58) Field of Classification Search
CPC ........... G06T 2207/30252; G06T 2207/10012; G06T 2207/30244; G06T 7/73; G06T 7/246; B60W 10/04; B60W 10/18; B60W 10/20; B60W 2420/403; B60W 2420/408; B60W 2552/35; G01S 17/89; G01S 17/931; G01S 17/86; G01S 7/4808; G06V 20/56; G06V 20/588; H04N 23/90; H04N 5/2625; H04N 5/2624; H04N 17/002
See application file for complete search history.

(56) References Cited

U.S. PATENT DOCUMENTS

| | | | | |
|---|---|---|---|---|
| 2015/0264234 | A1* | 9/2015 | Wang | H04N 23/57 348/148 |
| 2017/0347030 | A1* | 11/2017 | Guerreiro | G06T 7/277 |
| 2018/0210442 | A1* | 7/2018 | Guo | G05D 1/0038 |
| 2019/0258251 | A1* | 8/2019 | Ditty | G06V 20/58 |
| 2019/0325595 | A1* | 10/2019 | Stein | G06T 7/248 |
| 2019/0384304 | A1* | 12/2019 | Towal | G05D 1/0221 |
| 2020/0242391 | A1* | 7/2020 | Takahashi | G06V 10/44 |
| 2021/0295561 | A1* | 9/2021 | Abbeloos | G06T 7/70 |
| 2023/0256975 | A1* | 8/2023 | Li | G06V 20/58 701/1 |

FOREIGN PATENT DOCUMENTS

| | | | | | |
|---|---|---|---|---|---|
| CN | 116343155 | A | * | 6/2023 | |
| CN | 116645650 | A | * | 8/2023 | ............ B60W 40/10 |
| CN | 116912328 | A | * | 10/2023 | |
| CN | 117372244 | A | * | 1/2024 | |
| DE | 102022111797 | A1 | * | 2/2023 | ............ B60R 1/00 |
| EP | 3057062 | A1 | * | 8/2016 | ............ G06T 5/006 |
| EP | 3086284 | A1 | * | 10/2016 | ......... G06K 9/00791 |
| JP | 7358540 | B2 | * | 10/2023 | ............ B60W 40/06 |
| WO | WO-2022148143 | A1 | * | 7/2022 | |

OTHER PUBLICATIONS

Liu, Y et al. Photometric alignment for surround view camera system. 2014 IEEE International Conference on Image Processing (ICIP), Paris, France, 2014, pp. 1827-1831 [online], [retrieved on Mar. 6, 2024]. Retrieved from the Internet <URL:https://ieeexplore.ieee.org/stamp/stamp.jsp?tp=&arnumber=7025366> (Year: 2014).*

* cited by examiner

ON-VEHICLE SPATIAL MONITORING SYSTEM

INTRODUCTION

Vehicles may include on-board cameras for monitoring an environment proximal to a vehicle during operation, to operate advanced driver assistance systems (ADAS) and/or autonomous vehicle functions. Correct alignment of one or more on-vehicle cameras relative to a reference such as ground is necessary for operation of a bird's eye view imaging system, travel lane sensing, autonomic vehicle control, etc. Presence of an uneven road surface may degrade performance of a spatial monitoring system and an autonomic vehicle control system due to its effect upon camera to ground alignment.

As such, there is a need for a method, system and apparatus to detect an uneven road surface and dynamically adjust or otherwise compensate camera alignment in response.

SUMMARY

The concepts described herein provide a vehicle that includes a spatial monitoring system to detect an uneven road surface and dynamically adjust or otherwise compensate camera alignment and/or vehicle control based thereon.

An aspect of the disclosure includes vehicle having a spatial monitoring system that includes a plurality of on-vehicle cameras in communication with a controller. The plurality of on-vehicle cameras includes a front camera arranged to capture a front image of a forward field of view (FOV), a rear camera arranged to capture a rear image of a rearward FOV, a left camera arranged to capture a left image of a leftward FOV, and a right camera arranged to capture a right image of a rightward FOV. The controller including an instruction set that is executable to capture, simultaneously, the front image from the front camera, the rear image from the rear camera, the left image from the left camera and the right image from the right camera, and recover a plurality of three-dimensional (3D) points from the front image and the rear image. A left ground plane normal vector is determined for the left image, a center ground plane normal vector is determined from the front image, and right ground plane normal vector is determined from the right image based upon the plurality of 3D points from one of the front image or the rear image. A first angle difference is determined between the left ground plane normal vector and the center ground plane normal vector, and a second angle difference is determined between the right ground plane normal vector and the center ground plane normal vector. An uneven ground surface is determined based upon one of the first angle difference or the second angle difference, and an alignment compensation factor for one of the left camera or the right camera based upon the uneven ground surface. A bird's eye view image is generated based upon the alignment compensation factor.

Another aspect of the disclosure includes an autonomic vehicle control system capable of autonomously controlling one of a steering system, an acceleration system, or a braking system based upon the bird's eye view image.

Another aspect of the disclosure includes the front image, the rear image, the left image and the right image being 2D fish-eye images.

Another aspect of the disclosure includes the instruction set being executable to recover the plurality of three-dimensional (3D) points from the 2D fish-eye images employing a structural from motion analysis.

Another aspect of the disclosure includes the instruction set being executable to determine a ground plane normal vector for the left image, the front image, and the right image.

Another aspect of the disclosure includes the instruction set being executable to use feature detection and matching routines to find matched pairs of features in an overlap region between the front image and the left image.

Another aspect of the disclosure includes the instruction set being executable to determine an essential matrix and a rotation transformation matrix based upon the matched pairs of features, wherein the rotation transformation matrix comprises the alignment compensation factor.

Another aspect of the disclosure includes the instruction set being executable to determine a left camera ground plane normal vector based upon the rotation transformation matrix and the center camera normal matrix, and align the left camera to ground employing the left camera ground plane normal vector.

Another aspect of the disclosure includes the instruction set being executable to generate the bird's eye view image based upon alignment of the left camera to ground.

Another aspect of the disclosure includes the instruction set being executable to determine a front motion vector, a left motion vector, a ground plane normal vector from the left region, and an original ground plane normal vector, and determine a rotation transformation matrix that minimizes loss based upon a relationship between the front motion vector, the left motion vector, the ground plane normal vector from the left region, and the original ground plane normal vector.

Another aspect of the disclosure includes the instruction set being executable to generate the bird's eye view image based upon the front image, the left image, the right image, the rear image, and the alignment compensation factor.

Another aspect of the disclosure includes a vehicle having a spatial monitoring system having plurality of on-vehicle cameras in communication with a controller, the plurality of on-vehicle cameras including a front camera arranged to capture a front image of a forward field of view (FOV), and a left camera arranged to capture a left image of a leftward FOV. The controller includes an instruction set that is executable to capture, simultaneously, the front image and the left image and recover a plurality of three-dimensional (3D) points from the left image. A left ground plane normal vector is determined for the left image based upon a near region of the plurality of 3D points from the left camera, and a distance to the left ground plane normal vector is determined for each of the 3D points. Presence of a curb on the left side is determined based upon the distance to the left ground plane normal vector for each of the 3D points.

Another aspect of the disclosure includes the vehicle having an autonomic vehicle control system capable of autonomously controlling one of a steering system, an acceleration system, or a braking system based upon the presence of the curb on the left side.

Another aspect of the disclosure includes a vehicle having a spatial monitoring system including a light detection and ranging (LiDAR) device and a controller, the LiDAR device arranged to capture data representing a forward field of view (FOV), a rearward FOV, a leftward FOV, and a rightward FOV. The controller including an instruction set that is executable to capture a plurality of images from the LiDAR device and determine a left image, a front image, and a right image based upon the plurality of images from the LiDAR device. A left ground plane normal vector is determined for the left image, a center ground plane normal vector is determined from the front image, and right ground plane normal vector is determined from the right image based upon the plurality of images from the LiDAR device. A first angle difference is determined between the left ground plane normal vector and the center ground plane normal vector, and a second angle difference is determined between the right ground plane normal vector and the center ground plane normal vector. An uneven ground surface based upon one of the first angle difference or the second angle difference, and an alignment compensation factor based upon the uneven ground surface. A bird's eye view image is determined based upon the alignment compensation factor and the uneven ground surface.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 5-1 pictorially shows an original fish-eye image captured by a front camera of a vehicle operating on a road surface, in accordance with the disclosure.

FIG. 5-2 graphically shows a multiplicity of points associated with the original fisheye image that is captured by the front camera of the vehicle of FIG. 5-1, in accordance with the disclosure.

FIG. 5-3 pictorially shows a second image in the form of an undistorted image having multiplicity of vector points that are extracted from consecutive original fish-eye images of FIG. 5-1 and depicting the ground plane, in accordance with the disclosure.

FIG. 5-4 graphically shows the indicated ground plane, in the xyz-plane, that is extracted from the original fish-eye image of FIG. 5-1, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
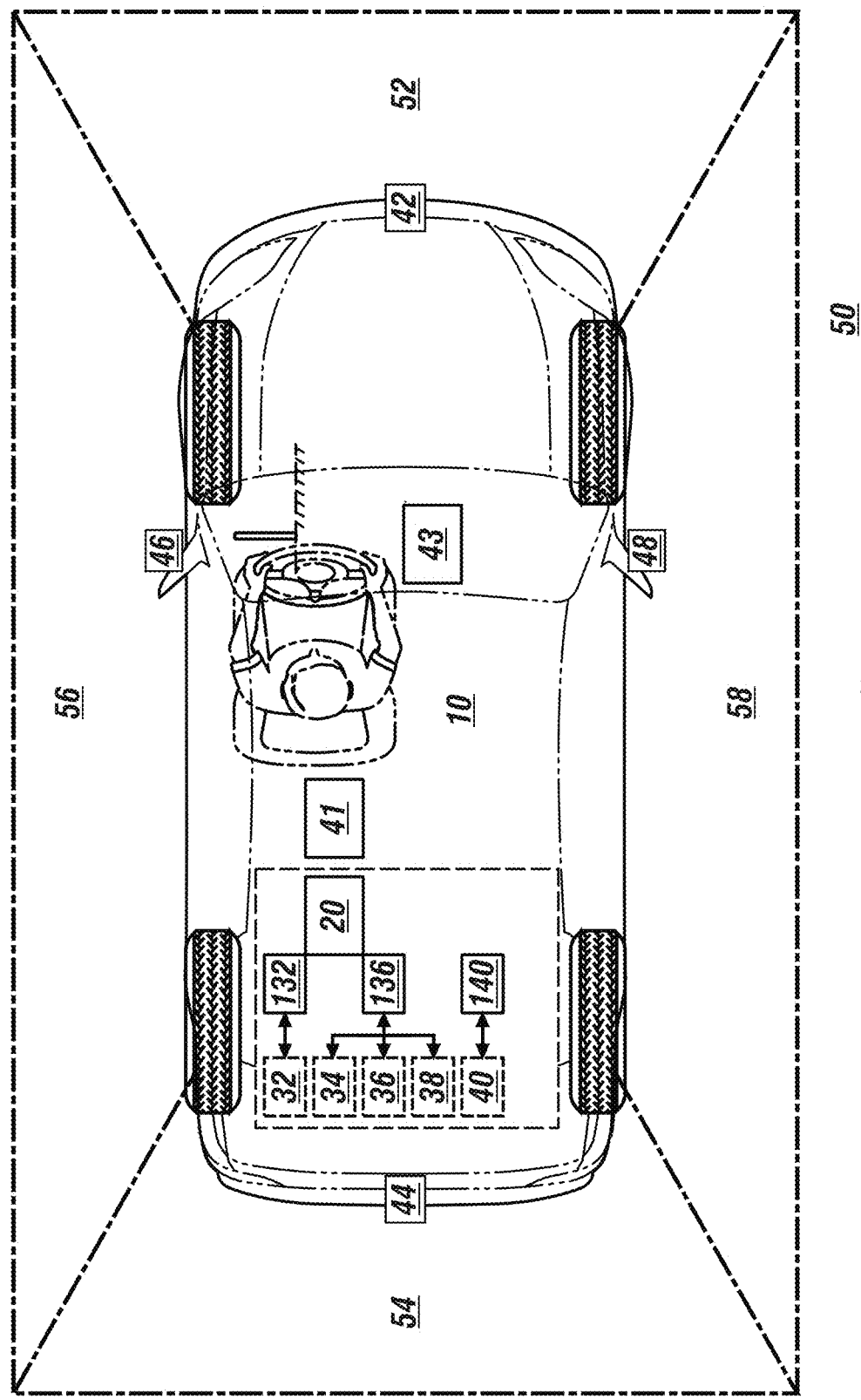
FIG. 1 schematically shows a vehicle including a spatial monitoring system and an autonomic vehicle control system, in accordance with the disclosure.

Referring to the drawings, wherein like reference numerals correspond to like or similar components throughout the several Figures, FIG. 1, consistent with embodiments disclosed herein, illustrates top view of a vehicle 10 disposed on a ground surface 50 and having a spatial monitoring system 40 that is illustrative of the concepts described herein. In one embodiment, the vehicle 10 also includes an autonomic vehicle control system 20. The vehicle 10 may include, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

The spatial monitoring system 40 and spatial monitoring controller 140 can include a controller that communicates with a plurality of spatial sensors 41 to monitor fields of view proximal to the vehicle 10 and generate digital representations of the fields of view including proximate remote objects.

The spatial monitoring controller 140 can evaluate inputs from the spatial sensors 41 to determine a linear range, relative speed, and trajectory of the vehicle 10 in relation to each proximate remote object.

The spatial sensors 41 are located at various locations on the vehicle 10, and include a front camera 42 capable of viewing a forward field of view (FOV) 52, a rear camera 44 capable of viewing a rearward FOV 54, a left camera 46 capable of viewing a leftward FOV 56, and a right camera 48 capable of viewing a rightward FOV 58. The front camera 42, rear camera 44, left camera 46 and right camera 48 are capable of capturing and pixelating 2D images of their respective FOVs. The forward FOV 52, rearward FOV 54, leftward FOV 56, and rightward FOV 58 overlap. The front camera 42, rear camera 44, left camera 46 and right camera 48 may utilize fish-eye lenses to maximize the reach of their respective FOVs. The spatial sensors 41 may further include a radar sensor and/or a LiDAR device 43, although the disclosure is not so limited.

Placement of the aforementioned spatial sensors 41 permits the spatial monitoring controller 140 to monitor traffic flow including proximate vehicles, other objects around the vehicle 10, and the ground surface 50. Data generated by the spatial monitoring controller 140 may be employed by a lane mark detection processor (not shown) to estimate the roadway. The spatial sensors 41 of the spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more proximal vehicle(s). Such sensing systems are employed for detecting and locating objects in automotive applications and are useable with systems including, e.g., adaptive cruise control, autonomous braking, autonomous steering and side-object detection.

The spatial sensors 41 associated with the spatial monitoring system 40 are preferably positioned within the vehicle 10 in relatively unobstructed positions to monitor the spatial environment. As employed herein, the spatial environment includes all external elements, including fixed objects such as signs, poles, trees, houses, stores, bridges, etc., and moving or moveable objects such as pedestrians and other vehicles. Overlapping coverage areas of the spatial sensors 41 create opportunities for sensor data fusion.

The autonomic vehicle control system 20 includes an on-vehicle control system that is capable of providing a level of driving automation, e.g., an advanced driver assistance system (ADAS). The terms driver and operator describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor a spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132 that is operatively connected to one or more of a steering system 34, a braking system 36, and a chassis system 38.

Each of the vehicle systems and associated controllers may further include one or more subsystems and one or more associated controllers. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators.

The steering system 34 is configured to control vehicle lateral motion. The steering system 34 can include an electrical power steering system (EPS) coupled with an active front steering system to augment or supplant operator input through a steering wheel by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The concepts described herein provide a method, system and/or apparatus that includes an algorithm to enhance online camera to ground alignment and bird eye view imaging, which is executed by an embodiment of the vehicle 10 and spatial monitoring system 40 that are described with reference to FIG. 1. This includes, in one embodiment, using regions of images from a front camera 42 and a rear camera 44 to dynamically detect an uneven ground surface, and calculate a ground orientation based thereon. The uneven ground surface detection is accomplished using an angle difference to determine alignment to generate a bird's eye view image and improve redundant lane sensing, with a camera to ground alignment correction for side cameras using ground orientation from front/rear cameras.

The concepts described herein provide for generating a bird's eye view image surrounding an embodiment of the vehicle 10 employing the spatial monitoring system 40, as described with reference to FIGS. 3 through 12. The spatial monitoring system 40 includes instruction sets that are executed in one or a plurality of controllers. The instruction sets include capturing, simultaneously, images from the front camera, the rear camera, the left camera and the right camera, representing the forward FOV 52, rearward FOV 54, leftward FOV 56, and rightward FOV 58, and recovering a plurality of three-dimensional (3D) points from the front camera and the rear camera. A left ground plane normal vector, a center ground plane normal vector, and a right ground plane normal vector are determined from the center image based upon the plurality of 3D points from the front camera. A first angle difference between the left ground plane normal vector and the center ground plane normal vector is determined, and a second angle difference between the right ground plane normal vector and the center ground plane normal vector is determined. An uneven ground surface based upon one of the first angle difference or the second angle difference, and an alignment compensation factor for one of the left camera or the right camera is determined based upon the uneven ground surface. A bird's eye view image is generated based upon the alignment compensation factor and the uneven ground surface. In one embodiment, operation of the autonomic vehicle control system 20 is controlled based upon one or more of the bird's eye view image, the alignment compensation factor and the uneven ground surface.

Figure 2:
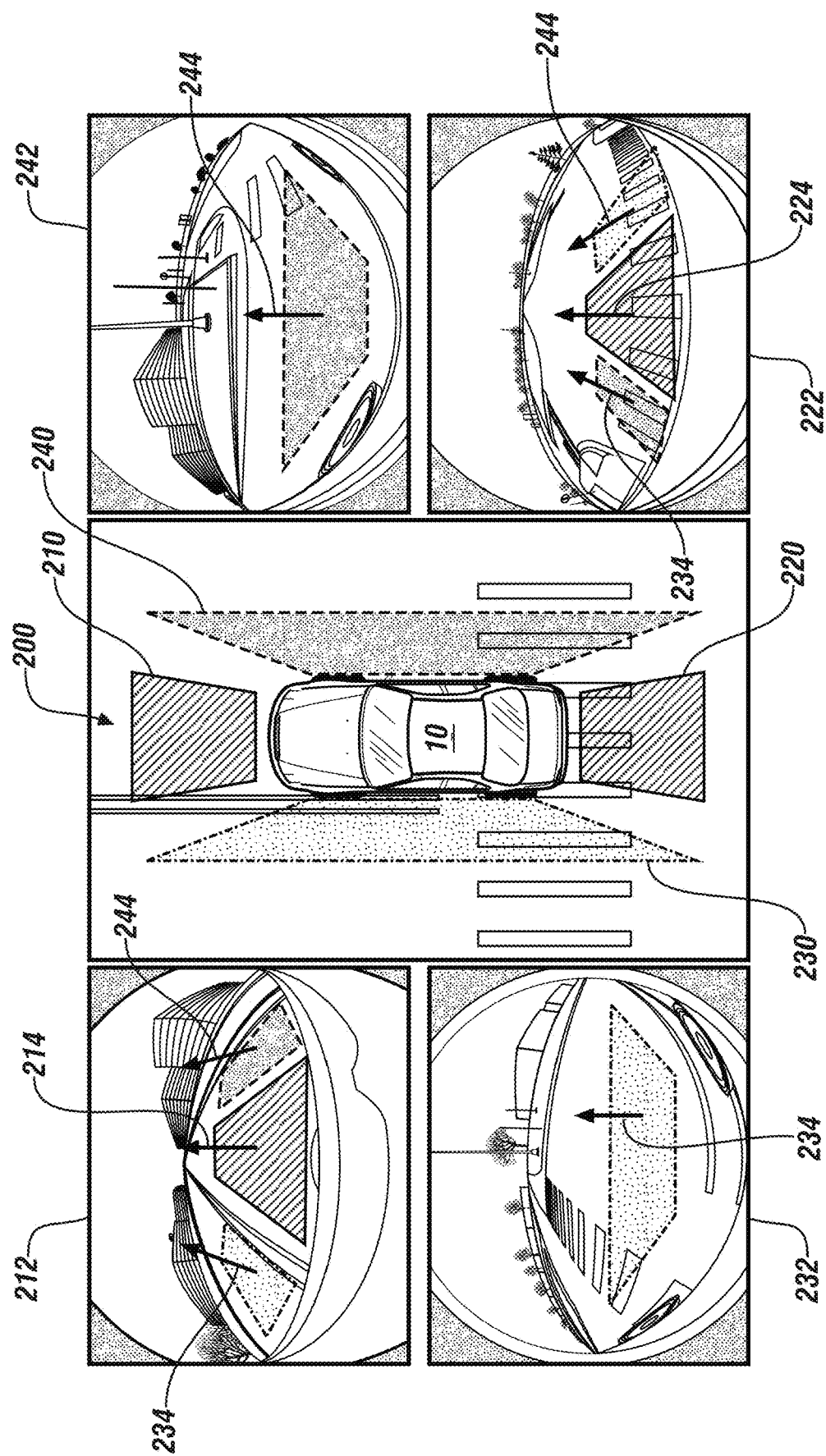
FIG. 2 pictorially shows a top view of a vehicle disposed on a ground surface and an associated bird's eye view image, in accordance with the disclosure.

Referring now to FIG. 2, with continued reference to the vehicle 10 described with reference to FIG. 1, a plurality of digital images are depicted, including a forward 2D fish-eye image 212 from camera 42, a rearward 2D fish-eye image 222 from camera 44, a leftward 2D fish-eye image 232 from camera 46, and a rightward 2D fish-eye image 242 from camera 48, from which a bird's eye view (BV) image 200 for the vehicle 10 is derived. The BV image 200 is created by recovering 3D points for each of aforementioned fish-eye images that are simultaneously captured images from the spatial sensors 41. The BV image 200 includes a first image 210 from the forward 2D fish-eye image 212 of frontward FOV 52, a second image 220 from the rearward 2D fish-eye image 222 of rearward FOV 54, a third image 230 from the leftward 2D fish-eye image 232 of the leftward FOV 56, and a fourth image 240 from the rightward 2D fish-eye image 242 of the rightward FOV 58. Also depicted are a front normal vector 214 that is orthogonal to the ground surface 250 in the frontward FOV 52, a rear normal vector 224 that is orthogonal to the ground surface 250 in the rearward FOV 54, a left normal vector 234 that is orthogonal to the ground surface 250 in the leftward FOV 56, and a right normal vector 244 that is orthogonal to the ground surface 250 in the rightward FOV 58.

Figure 3:
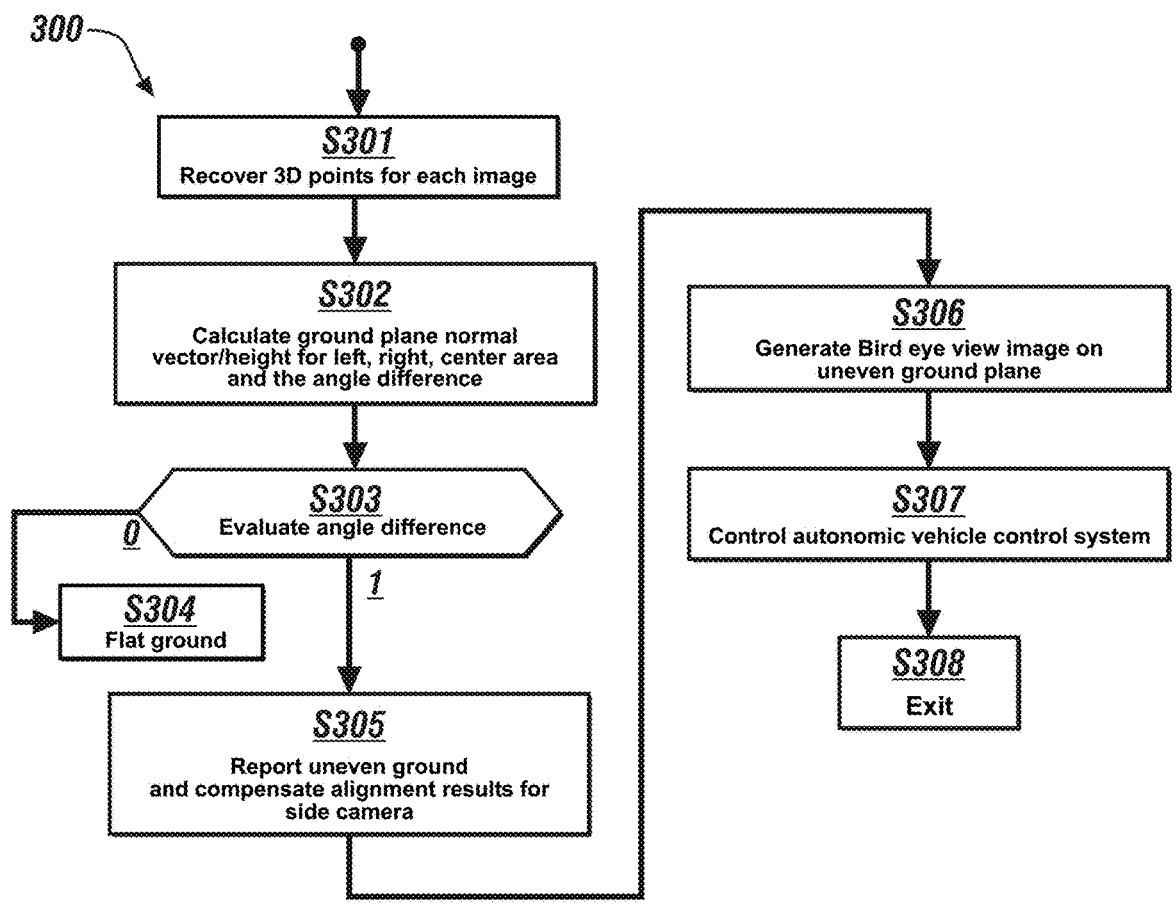
FIG. 3 schematically illustrates a method for generating a bird's eye view image of an area surrounding a vehicle for controlling operation thereof, in accordance with the disclosure.

FIG. 3 schematically illustrates details related to a method, system, and apparatus (method) 300 for generating a bird's eye view image surrounding an embodiment of the vehicle 10 of FIG. 1, and controlling operation thereof in response. The method 300 is reduced to practice as a plurality of algorithms, which are illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 1 is provided as a key wherein the numerically labeled blocks and the corresponding functions are set forth as follows.

TABLE 1

| BLOCK | BLOCK CONTENTS |
|---|---|
| S301 | Recover 3D points for each image |
| S302 | Calculate ground plane normal vectors and height for left, front, right ground plane normal vectors, and angular differences. |
| S303 | Evaluate angular differences |
| S304 | Flat ground reported |
| S305 | Report uneven ground; Compensate alignment for side camera |
| S306 | Generate bird's eye view image on uneven ground |
| S307 | Control autonomic vehicle control system |
| S308 | End iteration |

Execution of the method 300 may proceed as follows during operation of the vehicle 10. The steps of the method 300 may be executed in a suitable order, and are not limited to the order described with reference to FIG. 3. As employed herein, the term "1" indicates an answer in the affirmative, or "YES", and the term "0" indicates an answer in the negative, or "NO".

During vehicle operation, Step S301 includes recovering 3D points for each of the original 2D fish-eye images from the plurality of cameras using a structure from motion (SfM) photogrammetric technique for the front and rear cameras. This is described in detail with reference to FIG. 4.

At step S302, left, front, right ground plane normal vectors and related angles are calculated, along with determining angular differences therebetween. A first angular difference between the left ground plane normal vector and the front ground plane normal vector is determined, and a second angular difference between the right ground plane normal vector and the front ground plane normal vector is determined. This is described in detail with reference to FIG. 6.

At step S303, the first angular difference between the left ground plane normal vector and the front ground plane normal vector is compared with a threshold angular difference, and the second angular difference between the right ground plane normal vector and the front ground plane normal vector is compared with the threshold angular difference.

When both the first angular difference is less than the threshold angular distance, and the second angular difference is less than the threshold angular distance (0), the method determines that the ground surface has minimal or no unevenness, i.e., flat ground, and this iteration ends (S304).

When either the first angular difference is greater than the threshold angular distance, or the second angular difference is greater than the threshold angular distance (1), the method continues with S305.

At step S305, the occurrence of uneven ground is reported, and an alignment compensation is generated for the left camera 46 and/or the right camera 48. This is described in detail with reference to FIGS. 8 and 9.

At step S306 a bird's eye view image on the uneven ground is generated. This is described in detail with reference to FIG. 12.

At step S307, vehicle operation, including specifically operation of the autonomic vehicle control system 20 is controlled based upon one or more of the bird's eye view image, the alignment compensation factor and the uneven ground surface. The autonomic vehicle control system 20 is capable of autonomously controlling one or more of the steering system, the acceleration system, and the braking system, and does so based upon the bird's eye view image. This iteration of the method 300 ends (308).

Figure 4:
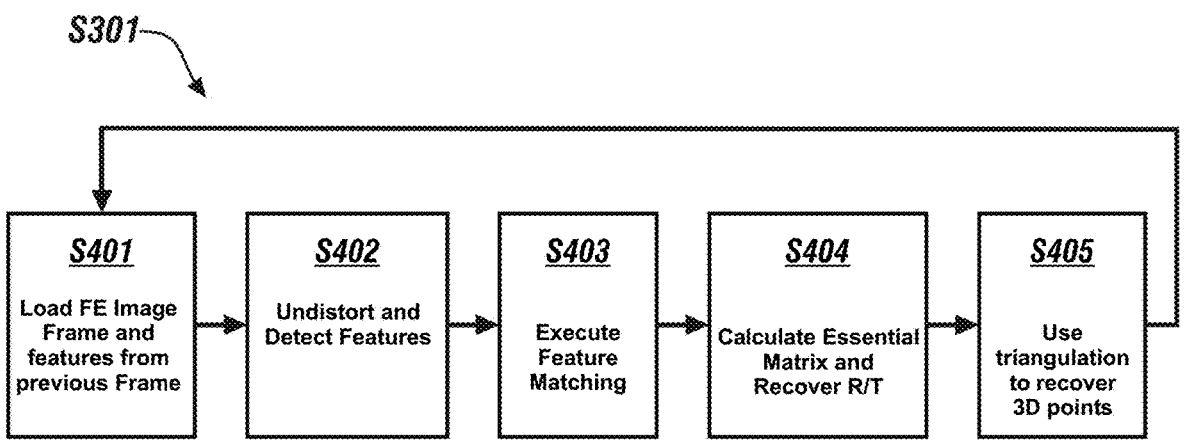
FIG. 4 schematically illustrates a method for recovering 3D points for each of the images from the plurality of cameras, in accordance with the disclosure.

FIG. 4 schematically illustrates details related to execution of Step S301 of FIG. 3, which includes recovering 3D points for each of the 2D images from the plurality of cameras using a structure from motion (SfM) photogrammetric technique for the front and rear cameras. Step S301 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 2 is provided as a key wherein the numerically labeled blocks and the corresponding functions are set forth as follows.

TABLE 2

| BLOCK | BLOCK CONTENTS |
|-------|----------------|
| S401  | Load FE image frame, features from previous frame |
| S402  | Undistort and detect features |
| S403  | Execute feature matching |
| S404  | Calculate essential matrix and recover R/T |
| S405  | Use triangulation to recover 3D points |

Execution of the detailed algorithmic elements related to step S301 iteratively proceeds with each successive image capture during operation of the vehicle 10.

During vehicle operation, image frames from the plurality of cameras and associated features from a previous frame are loaded at Step 401. The image frames from the plurality of cameras are fish-eye images. The features include, e.g., colors, textures, and other related elements from the image.

A feature detection algorithm, e.g., a Harris Corner Detector, is employed to undistort the image and detect features (S402). The Harris Corner Detector is a corner detection operator that may be employed in computer vision algorithms to extract corners and infer features of an image. Corners are features of an image, also referred to as interest points that are invariant to translation, rotation, or illumination.

The results of the corner detection operator are subjected to feature matching, e.g., optical flow feature matching (S403). An essential matrix is calculated to recover rotation and translation (R/T) features in the form of a rotation matrix and a translation vector (S404). Triangulation is employed to recover 3D points in the image (S405). These steps are elements of an embodiment of structure from motion (SfM) photogrammetric technique.

The outcome of each iteration (i.e., steps S401-S405) is an arrangement of the 3D points from the image that depict the ground plane in the image. The arrangement of the 3D points from the image that depict the ground plane in the image is provided as input to step 302 of FIG. 3.

Figures 1, 5:
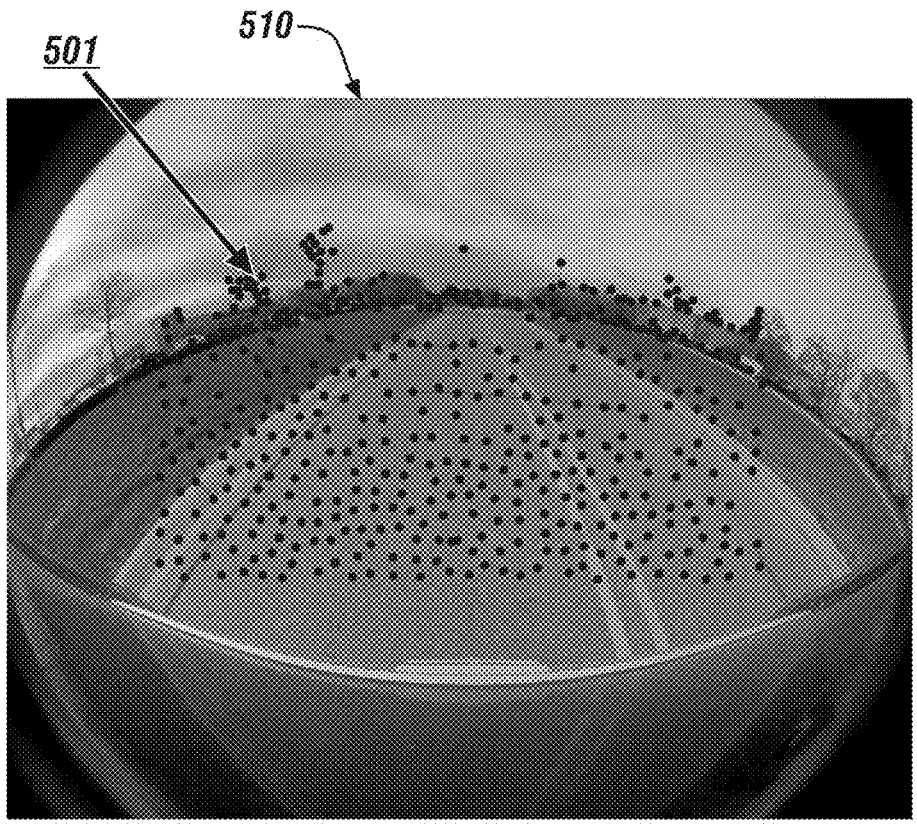
Figures 2, 5:
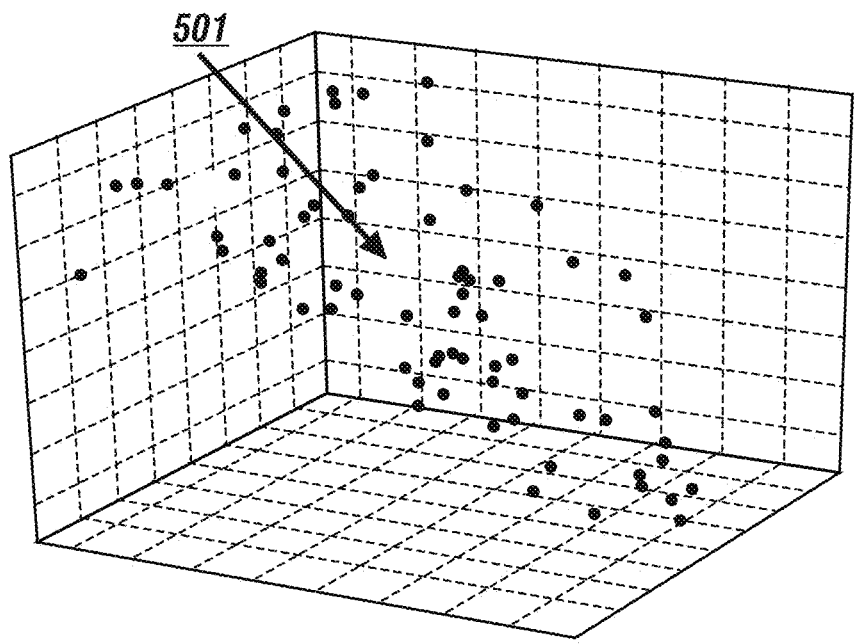
Figures 3, 5:
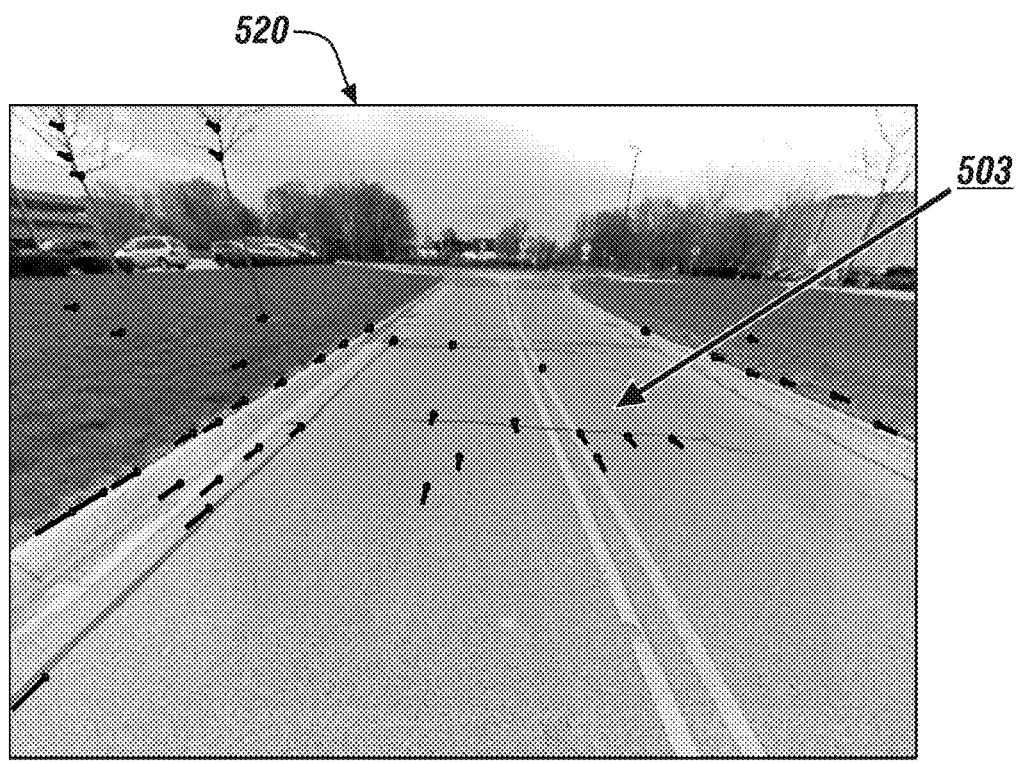
Figures 4, 5:
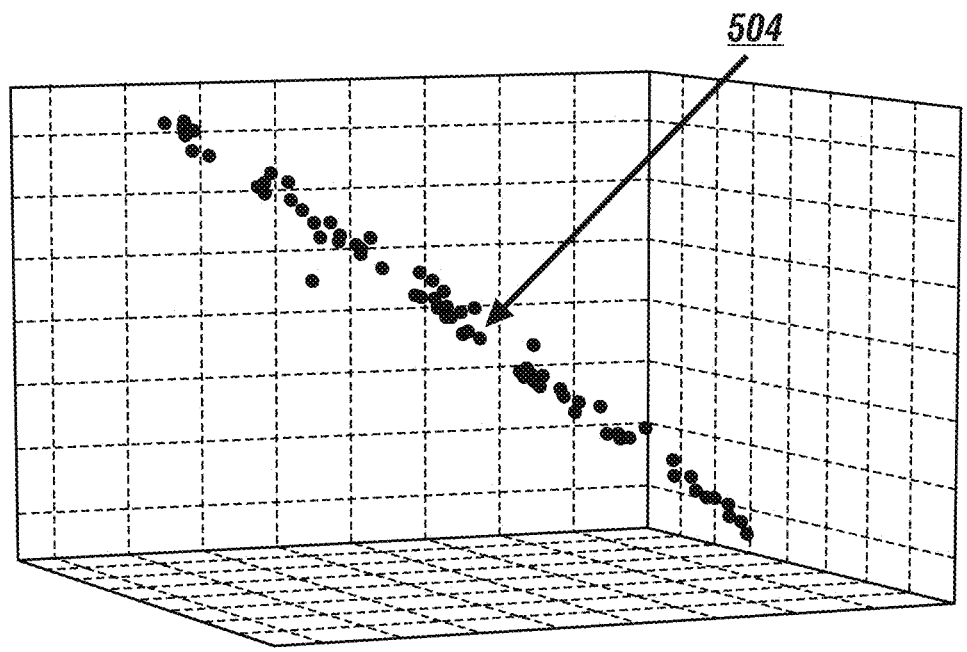

FIG. 5-1 pictorially shows an original fish-eye image 510 from an embodiment of the front camera 42 for the vehicle 10 operating on road surface 50, including a multiplicity of points, indicated by elements 501. FIG. 5-2 graphically shows the multiplicity of points, indicated by elements 501, in an xyz-plane. The multiplicity of points 501 represent 3D points in the camera coordinate system, and correspond to points on the ground.

FIG. 5-3 pictorially shows image 520 from an embodiment of the front camera 42 for the vehicle 10 operating on road surface 50, which is an undistorted image that is derived from the fish-eye image 510 of FIG. 5-1. The image 520 includes a multiplicity of vector points, indicated by elements 503, and representing the 3D points that are extracted from consecutive original images 510 from the same camera, and depict the ground plane 504 in the image that is determined employing the steps of FIG. 4. FIG. 5-4 graphically shows the indicated ground plane 504, in the xyz-plane.

Figure 6:
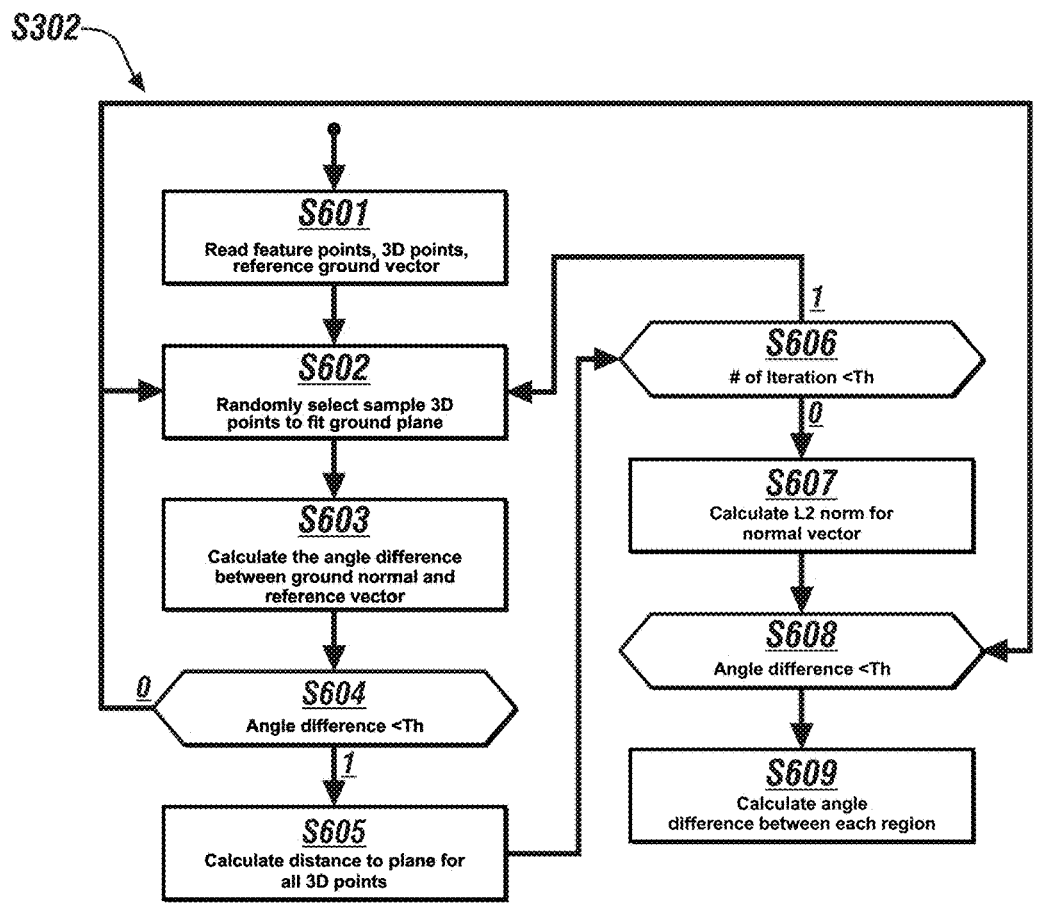
FIG. 6 schematically illustrates details related to execution of a routine to determine left, front, right, and rear ground plane normal vectors and related angles and angular differences therebetween, in accordance with the disclosure.

FIG. 6 schematically illustrates details related to execution of Step S302, to calculate left, front, right, and rear ground plane normal vectors and related angles and angular differences therebetween. A first angular difference between the left ground plane normal vector and the front ground plane normal vector is determined, and a second angular difference between the right ground plane normal vector and the front ground plane normal vector is determined. This is described in detail with reference to FIG. 6. Step S302 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 3 is provided as a key wherein the numerically labeled blocks and the corresponding functions are set forth as follows.

TABLE 3

| BLOCK | BLOCK CONTENTS |
|-------|----------------|
| S601  | Read feature points at left, front, right regions |
| S602  | Select sample 3D points to fit ground plane |
| S603  | Calculate angle difference |
| S604  | Is angle difference < threshold? |
| S605  | Calculate distance to plane for all 3D points |
| S606  | Is number of iterations less than threshold? |
| S607  | Calculate L2 norm |
| S608  | All left, front, right regions processed? |
| S609  | Calculate angle difference between regions |

Execution of the detailed algorithmic elements related to step S302 proceeds as follows with each successive image capture during operation of the vehicle 10.

At step S601, feature points at different regions, corresponding 3D points, and a reference ground vector are read. A sample of the 3D points is randomly selected that fit the ground plane using singular value decomposition (SVD) for each of the left, front, and right regions (S602). An angle difference is calculated between a ground plane normal vector and the reference vector (S603), and is compared to a threshold angle (S604). When the angle distance is greater than the threshold angle (S604)(0), this iteration jumps to step S602 and/or step S608.

When the angle distance is less than the threshold angle (S604)(1), a distance to the plane is calculated for all 3D points. The normal vector is maintained if the distances are less than the distance for the normal vector (S605).

An iteration count is kept and evaluated (S606). When the quantity of iterations is less than a threshold quantity (S606)(1), the routine returns to Step S602 to execute another iteration. When the quantity of iterations is greater than the threshold quantity (S606)(0), an L2 norm for the normal vector is calculated as the ground-to-camera height for the specific region (S607). These steps are repeated for each of the left, front, and right regions (S608). When a normal vector is determined for each of the left, front, and right regions, and angle differences are calculated between the normal vectors for the left, front, and right regions (S609), and is provided as input to step 303 of FIG. 3 for evaluation.

Figure 7:
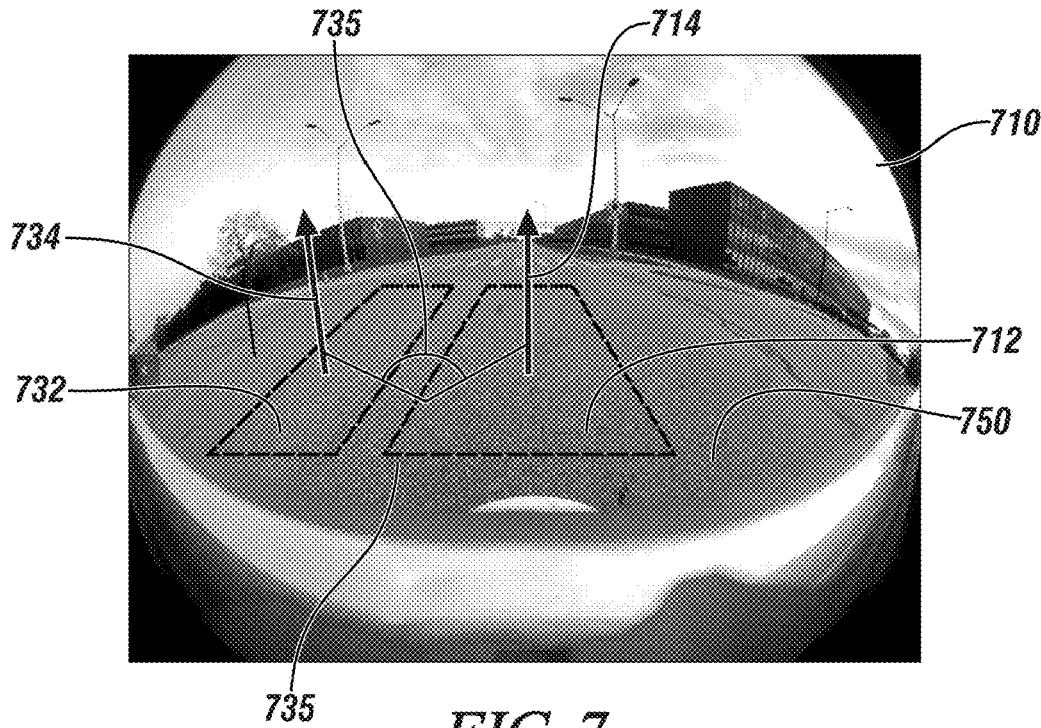
FIG. 7 pictorially depicts an original fish-eye image captured from a front camera for a vehicle operating on a road surface having a front image capture, a left image capture, and a right image capture identified thereon, in accordance with the disclosure.

FIG. 7 pictorially shows an original fish-eye image 710 from an embodiment of the front camera 42 for the vehicle 10 operating on road surface 750 having a front image 712 and a left image 732 identified thereon. A corresponding front normal vector 714 and left normal vector 734 are indicated. An angular difference 735 is identified, and represents an angle difference between the front normal vector 714 and the left normal vector 734, which is determined by Step S302, and the related algorithm described with reference to Steps S601 to S609, as described with reference to FIG. 6.

Figure 8:
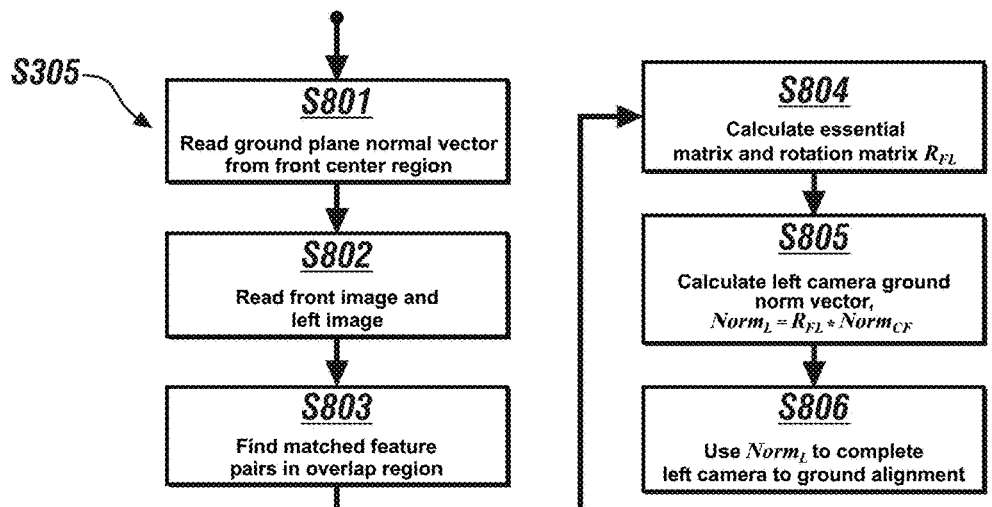
FIG. 8 schematically illustrates details related to a first embodiment of an alignment compensation routine for one of a left camera or a right camera based upon presence of uneven ground, in accordance with the disclosure.

FIG. 8 schematically illustrates details related an alignment compensation routine, which is an implementation of a first embodiment of Step S305, wherein alignment compensation is generated for the left camera 46 and/or the right camera 48 based upon presence of uneven ground. The routine is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 4 is provided as a key wherein the numerically labeled blocks and the corresponding functions are set forth as follows.

TABLE 4

| BLOCK | BLOCK CONTENTS |
|---|---|
| S801 | Read ground plane normal vector ($Norm_{CF}$) from front region |
| S802 | Read front image and left image (or right image) |
| S803 | Find matched pairs in overlap region using feature detection and matching algorithm |
| S804 | Calculate essential matrix, rotation matrix |
| S805 | Calculate left camera ground plane normal vector ($Norm_L$) |
| S806 | Use $Norm_L$ to complete left camera to ground alignment |

Execution of the first embodiment of the detailed algorithmic elements related to alignment compensation of Step 305 proceeds as follows with each successive image capture during operation of the vehicle 10.

At step S801, the ground plane normal vector from the front region ($Norm_{CF}$) is input, and at step 802 the front image and left (or right) image are read. The algorithm seeks to find matched pairs of features in an overlap region between the front image and the left image (or the right image for a right/front analysis) using feature detection and matching routines (S803). An essential matrix and rotation transformation matrix $R_{FL}$ are determined (S804), and a left camera ground plane normal vector $Norm_L$ is determined based upon the rotation transformation matrix Rim and the front camera normal matrix, i.e., $Norm_{CF}$ (S805). The left camera ground plane normal vector $Norm_L$ is employed to align the left camera to ground (S806). It is appreciated that this routine may also be executed to find the right camera ground plane normal vector $Norm_R$ to align the right camera to ground. The alignment of the left (or right) camera to ground is used by the method 300 to generate the bird's eye view image on uneven ground, as described with reference to Step S306 of FIG. 3. It is appreciated that the alignment compensation routine (Step S305) may be executed employing a ground plane normal vector from the rear region ($Norm_{CR}$) in place of the ground plane normal vector from the front region ($Norm_{CF}$) and one of the left (or right) image.

Figure 9:
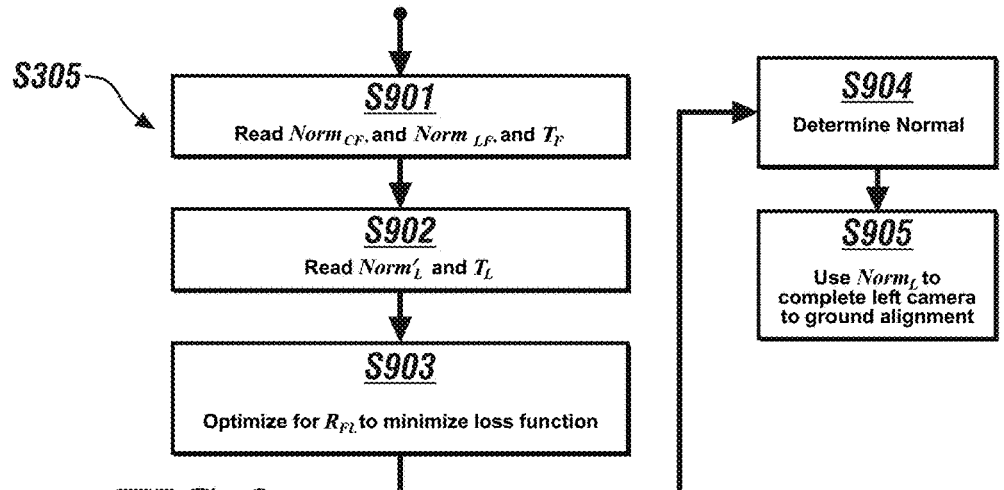
FIG. 9 schematically illustrates details related to a second embodiment of an alignment compensation routine for one of a left camera or a right camera based upon presence of uneven ground, in accordance with the disclosure.

FIG. 9 schematically illustrates details related to execution of a second embodiment of an alignment compensation routine (Step S305) to generate alignment compensation for the left camera 46 or the right camera 48. The alignment compensation routine is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 5 is provided as a key wherein the numerically labeled blocks and the corresponding functions are set forth as follows.

TABLE 5

| BLOCK | BLOCK CONTENTS |
|---|---|
| S901 | Read ground plane normal vector from front region $Norm_{CF}$; Read $Norm_{LF}$; read front motion vector $T_F$ |
| S902 | Read original normal vector from left camera $Norm'_L$; read rear motion vector $T_R$ |
| S903 | Optimize for $R_{FL}$ to minimize loss function |
| S904 | Determine left camera norm vector |
| S905 | Use $Norm_L$ to complete left camera to ground alignment |

Execution of the second embodiment of the detailed algorithmic elements related to alignment compensation of Step 305 proceeds as follows for each successive image capture during operation of the vehicle 10.

At step S901, the ground plane normal vector from the front region ($Norm_{CF}$) and the ground plane normal vector from the left region ($Norm_{LF}$) are provided as inputs, along with a front motion vector ($T_F$). At step S902, an original ground plane normal vector from the left region ($Norm'_{LF}$) and a left motion vector ($T_L$) are input. An optimization algorithm, e.g., an Adams algorithm, is executed to find an optimal value for the rotation transformation matrix $R_{FL}$ that satisfies the following loss function or relation:

$$L = T_L - R_{FL}*T_F + \lambda(Norm'_L - R_{FL}*Norm_{LF}) \quad [1]$$

wherein:

L is the loss function, which is being minimized; and $\lambda$ represents a scalar relation.

A geometric relation of a least-squares relation may be employed to determine the rotation transformation matrix $R_{FL}$ according to the following relations:

$$T_L = R_{FL}*T_F$$

$$Norm_L = R_{FL}*Norm_{LF}$$

The rotation transformation matrix Rim functions as an alignment compensation factor to effect alignment of the left camera 46 to ground 50. The left camera ground plane normal vector $Norm_L$ can be determined as follows in Step S904:

$$Norm_L = R_{FL} * Norm_{CF}$$

The left camera ground plane normal vector $Norm_L$ can be employed to determine the alignment of the left camera 46 to ground 50 (S905). It is appreciated that this routine may also be executed to find the right camera ground plane normal vector Norma to align the right camera 48 to ground 50. The alignment of the left (or right) camera to ground is used by the method 300 to generate the bird's eye view image on uneven ground, as described with reference to Step S306 of FIG. 3.

Figure 10:
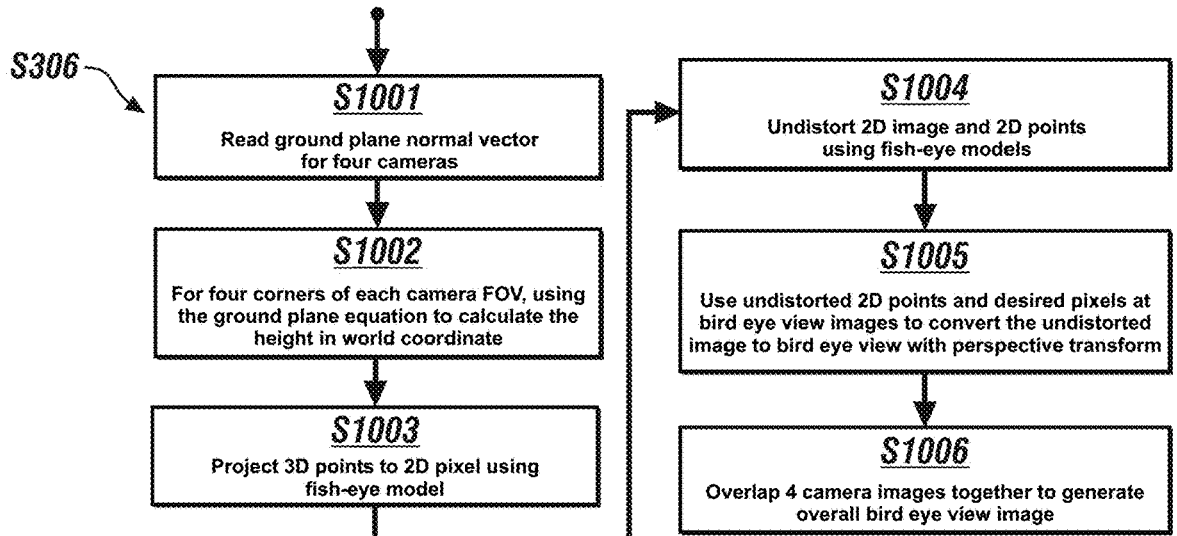
FIG. 10 schematically illustrates details related to a process for generating a bird's eye view image on the uneven ground, in accordance with the disclosure.

FIG. 10 schematically illustrates details related to generating a bird's eye view image on the uneven ground as set forth by step S306 of FIG. 3. The bird's eye view image generating routine of FIG. 10 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 6 is provided as a key wherein the numerically labeled blocks and the corresponding functions are set forth as follows.

TABLE 6

| BLOCK | BLOCK CONTENTS |
|---|---|
| S1001 | Read ground plane normal vectors for L, R, F, R cameras |
| S1002 | Use ground plane equation to determine height in world coordinate for four corners of each camera FOV |
| S1003 | Project 3D point to 2D pixels using fish-eye model |
| S1004 | Undistort 2D image and 2D points using fish-eye models |
| S1005 | Use undistorted 2D points and desired pixels at bird's eye view image to convert undistorted image to bird's eye view image with perspective transform |
| S1006 | Overlap 4 camera images to generate overall bird's eye view image |

Execution of the algorithmic elements related to Step 306 to generate the bird's eye view image proceeds as follows for each successive image capture during operation of the vehicle 10.

At step S1001, the ground plane normal vectors for left (L), right (R), front (F), and rear (R) cameras are read. At step S1002, a ground plane equation is employed to determine height in world coordinate for four corners of each FOV from the left (L), right (R), front (F), and rear (R) cameras.

The 3D points are projected to 2D pixels using a fish-eye model (S1003), and the 2D images and 2D points are undistorted using the fish-eye model (S1004).

The undistorted 2D points and desired pixels are used to convert undistorted image to bird's eye view image with perspective transform in a bird's eye view image (S1005), and the four camera images are overlapped to generate an overall bird's eye view image (S1006).

Figure 11:
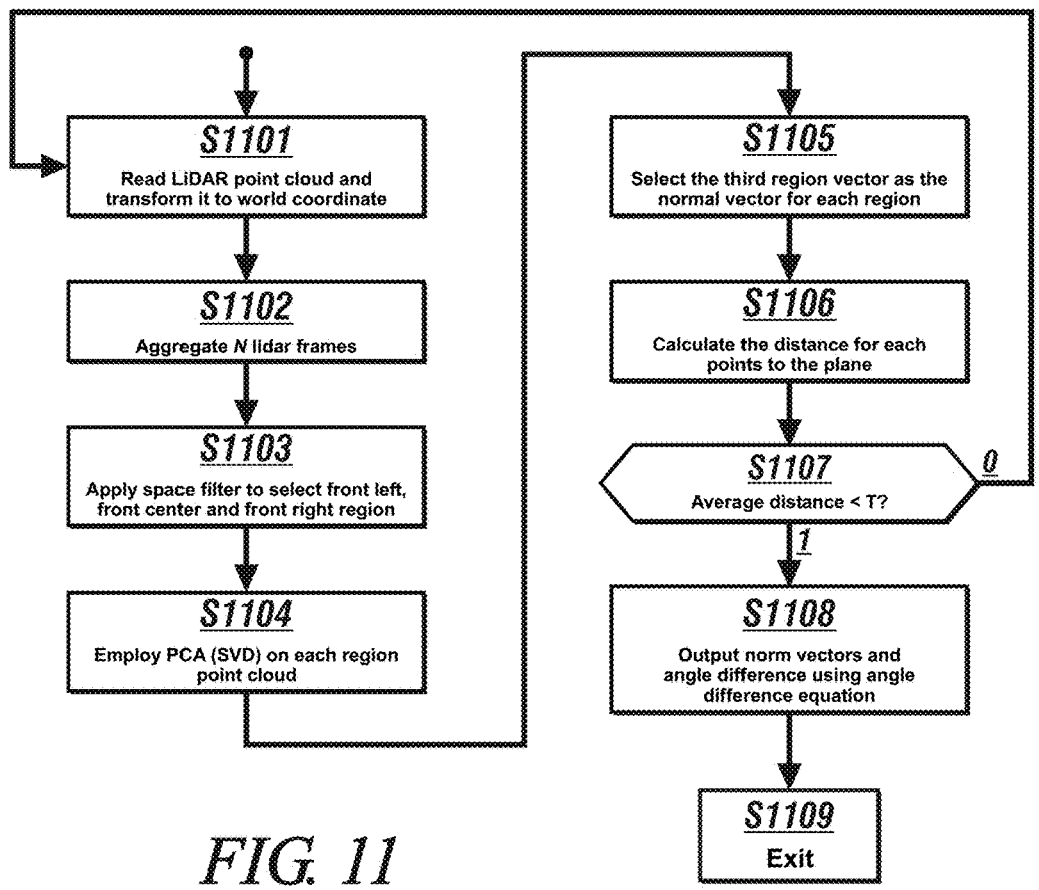
FIG. 11 schematically illustrates details related to a process for determining left, front, right ground plane normal vectors and related angles, and angular differences employing information from a LiDAR point cloud, in accordance with the disclosure.

FIG. 11 schematically illustrates details related an alternative embodiment for S302, for a vehicle configuration that employs an embodiment of the LiDAR device 43, wherein information from the front and rear cameras is replaced with a LiDAR point cloud to determine the left, front, right ground plane normal vectors and related angles, and angular differences.

The routine for determining the left, front, right ground plane normal vectors and related angles, and angular differences employing the LiDAR device 43 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 7 is provided as a key wherein the numerically labeled blocks and the corresponding functions are set forth as follows.

TABLE 7

| BLOCK | BLOCK CONTENTS |
|---|---|
| S1101 | Read LiDAR point cloud and transform to world coordinates |
| S1102 | Aggregate N LiDAR frames |
| S1103 | Select front left, front center, and front right regions |
| S1104 | Employ PCA(SVD) on each region point cloud |
| S1105 | Select third eigenvector as normal vector for each region |
| S1106 | Calculate distance for each point to the ground plane |
| S1107 | Is average distance less than threshold? |
| S1108 | Output normal vectors and angle difference using angle difference equation |
| S1109 | Exit |

Execution of the algorithmic elements related to employing the LiDAR device 43 to determine the left, front, right ground plane normal vectors and related angles, and angular differences using LiDAR proceeds as follows during operation of the vehicle 10.

Initially, at step S1101, a LiDAR point cloud is read and transformed to world (xyz) coordinates, with a quantity of N LiDAR frames being aggregated to account for sparsity of LiDAR points (S1102). A space filter is applied to the aggregated LiDAR frames to select front left, front center, and front right regions (S1103). Principal component analysis (PCA) with singular value decomposition (SVD) is employed to reduce the high-dimensional data set that is provided by each region point cloud (S1104), which includes generating a plurality of eigenvectors.

A third eigenvector is selected as a normal vector for each of the left-front, center-front, and right-front regions (S1105), and a distance for each of the points of the normal vectors to the ground plane is calculated (S1106). An average distance is calculated, and compared to a threshold value (S1107). When the average distance is greater than the threshold value (S1107)(0), the process repeats at step S1101. When the average distance is less than the threshold value (S1107)(1), the process outputs the normal vectors and angle difference using the angle difference equation (S1108), and this iteration ends (S1109). In this manner, the left, front, right ground plane normal vectors and related angles, and angular differences can be determined employing the LiDAR device, with such information being supplied to subsequent steps S303, et seq. of FIG. 3 to determine presence of uneven ground and generate a bird's eye view image.

Figure 12:
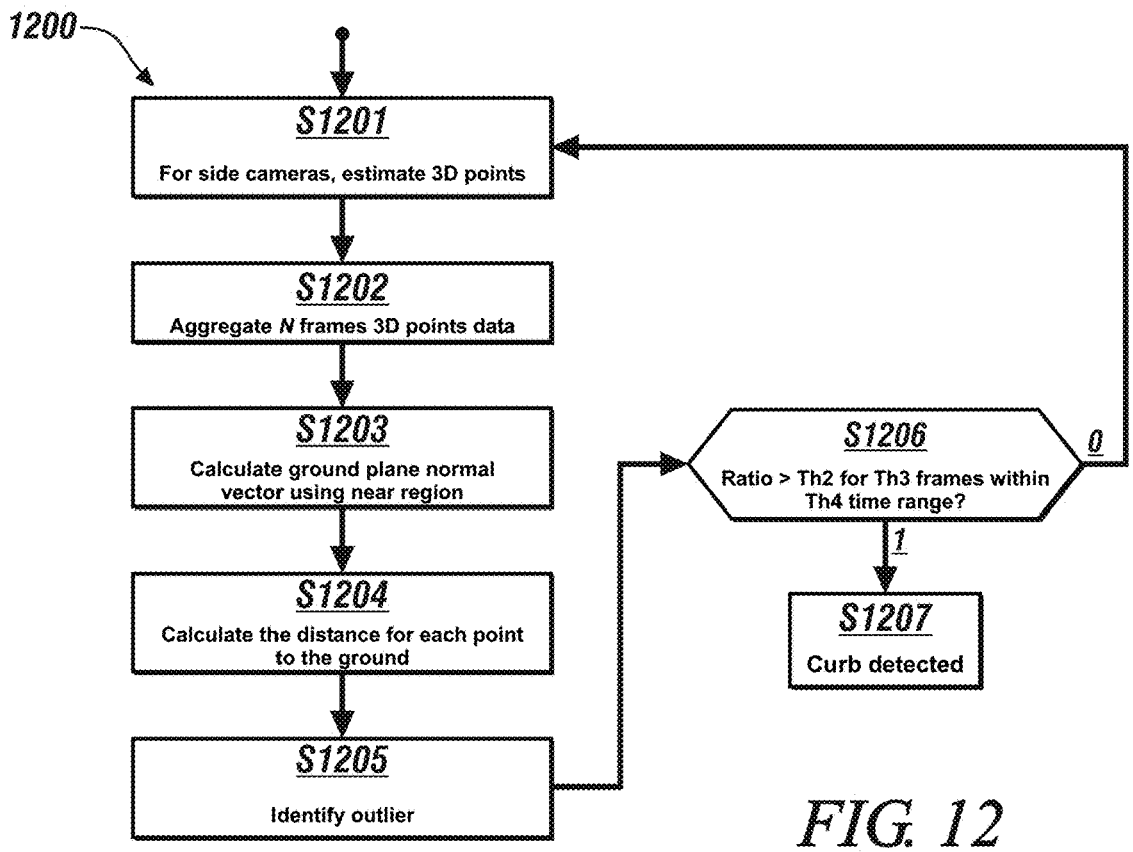
FIG. 12 schematically illustrates details related to a curb detection algorithm to detect presence of a curb in a FOV, in accordance with the disclosure.

FIG. 12 schematically illustrates details related to the curb detection routine 1200 to detect a curb in a FOV. A curb is a specific case for an uneven road wherein there may be inaccurate alignment results due to presence of two different ground planes.

The curb detection routine 1200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 and spatial monitoring system 40 shown in FIG. 1. Table 8 is provided as a key wherein the numerically labeled blocks and the corresponding functions are set forth as follows.

TABLE 8

| BLOCK | BLOCK CONTENTS |
| --- | --- |
| S1201 | Estimate 3D points for left, right side cameras |
| S1202 | Aggregate N frames of 3D points |
| S1203 | Calculate ground plane normal vector in near region |
| S1204 | Calculate distance for each point to the ground plane normal vector |
| S1205 | Identify outliers |
| S1206 | Is a ratio greater than threshold for period of time? |
| S1207 | Curb detected |

Execution of the algorithmic elements related to the curb detection routine 1200 proceeds as follows during operation of the vehicle 10.

Initially, at step S1201, S301 is executed for data from the left and right side cameras to estimate 3D points, with N quantity of frames of the 3D points being aggregated (S1202). A ground plane normal vector is determined employing vector information associated with a near region, e.g., within a calibrated distance from the vehicle 10 and accounting for an estimated ground height of the respective camera (S1203), and a distance for each of the points to the ground plane is calculated (S1204). Outliers are identified as being those points that have a distance that is greater than a first threshold ratio and a ground height that is greater than a second threshold (S1205), and evaluated by comparison (S1206), with a curb being detected when the evaluation of the outliers indicates that the ground height is greater than a minimum threshold (Th2) for at least a period of a quantity of consecutive image frames (Th3) within a time range (Th4) (S1207). In this manner, detection of an uneven road surface, misalignment of a left or right camera, curb detection, and alignment of a bird's eye view image is accomplished.

On-vehicle cameras are subjected to dynamically changing internal and external factors such as an uneven road surfaces, which may affect operation of the on-vehicle systems whose operations rely upon the camera images. The concepts described herein provide a method, system and/or apparatus that is able to capture a front image from a front camera, a rear image from a rear camera, a left image from a left camera and a right image from a right camera; recover a plurality of three-dimensional (3D) points from the front image and the rear image; determine a left ground plane normal vector for the left image, a center ground plane normal vector from the front image, and right ground plane normal vector from the right image based upon the plurality of 3D points from one of the front image or the rear image; determine a first angle difference between the left ground plane normal vector and the center ground plane normal vector; determine a second angle difference between the right ground plane normal vector and the center ground plane normal vector; detect an uneven ground surface based upon one of the first angle difference or the second angle difference; and determine an alignment compensation factor for one of the left camera or the right camera based upon the uneven ground surface. A bird's eye view image is generated based upon the alignment compensation factor, and vehicle operation may be controlled based thereon. Accordingly, the claimed embodiments effectuate an improvement in the technical field.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The use of ordinals such as first, second and third does not necessarily imply a ranked sense of order, but rather may only distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A vehicle, comprising:
a spatial monitoring system having a plurality of on-vehicle cameras in communication with a controller, the plurality of on-vehicle cameras including a front camera arranged to capture a front image of a forward field of view (FOV), a rear camera arranged to capture a rear image of a rearward FOV, a left camera arranged to capture a left image of a leftward FOV, and a right camera arranged to capture a right image of a rightward FOV;

the controller including an instruction set that is executable to:

capture, simultaneously, the front image from the front camera, the rear image from the rear camera, the left image from the left camera and the right image from the right camera;

recover a plurality of three-dimensional (3D) points from the front image and the rear image;

determine a left ground plane normal vector for the left image, a center ground plane normal vector from the front image, and right ground plane normal vector from the right image based upon the plurality of 3D points from one of the front image or the rear image;

determine a first angle difference between the left ground plane normal vector and the center ground plane normal vector;

determine a second angle difference between the right ground plane normal vector and the center ground plane normal vector;

detect an uneven ground surface based upon one of the first angle difference or the second angle difference;

determine an alignment compensation factor for one of the left camera or the right camera based upon the uneven ground surface; and generate a bird's eye view image based upon the alignment compensation factor.

2. The vehicle of claim 1, further comprising:

an autonomic vehicle control system capable of autonomously controlling one of a steering system, an acceleration system, or a braking system;

wherein the autonomic vehicle control system controls one of the steering system, the acceleration system, or the braking system based upon the bird's eye view image.

3. The vehicle of claim 1, wherein the front image, the rear image, the left image and the right image comprise 2D fish-eye images.

4. The vehicle of claim 3, wherein the instruction set is executable to recover the plurality of 3D points from the 2D fish-eye images employing a structural from motion analysis.

5. The vehicle of claim 1, wherein the instruction set is executable to determine a ground plane normal vector for the left image, the front image, and the right image.

6. The vehicle of claim 1, wherein the instruction set being executable to determine the alignment compensation factor for the left camera based upon the uneven ground surface comprises the instruction set being executable to:

use feature detection and matching routines to find matched pairs of features in an overlap region between the front image and the left image.

7. The vehicle of claim 6, further comprising the instruction set being executable to determine an essential matrix and a rotation transformation matrix based upon the matched pairs of features, wherein the rotation transformation matrix comprises the alignment compensation factor.

8. The vehicle of claim 7, further comprising the instruction set being executable to:

determine a left camera ground plane normal vector based upon the rotation transformation matrix and the center camera normal matrix; and align the left camera to ground employing the left camera ground plane normal vector.

9. The vehicle of claim 8, further comprising the instruction set being executable to generate the bird's eye view image based upon alignment of the left camera to ground.

10. The vehicle of claim 7, wherein the instruction set executable to determine the rotation transformation matrix comprises the instruction set being executable to:

determine a front motion vector, a left motion vector, a ground plane normal vector from the leftward FOV, and an original ground plane normal vector; and determine a rotation transformation matrix that minimizes loss based upon a relationship between the front motion vector, the left motion vector, the ground plane normal vector from the leftward FOV, and the original ground plane normal vector.

11. The vehicle of claim 1, further comprising the instruction set being executable to generate the bird's eye view image based upon the front image, the left image, the right image, the rear image, and the alignment compensation factor.

12. A vehicle, comprising:

a spatial monitoring system having an on-vehicle camera in communication with a controller, the on-vehicle camera being one of a front camera arranged to capture a front image of a forward field of view (FOV), a left camera arranged to capture a left image of a leftward FOV, a right camera arranged to capture a right image of a rightward FOV, or a rear camera arranged to capture a rear image of rearward FOV;

the controller including an instruction set that is executable to:

capture an image from the on-vehicle camera;

recover a plurality of three-dimensional (3D) points from the image;

determine a ground plane normal vector for the image based upon a near region of the plurality of 3D points from the left camera;

determine a distance to the ground plane normal vector for each of the 3D points; and detect a presence of a curb in the respective FOV based upon the distance to the left ground plane normal vector for each of the 3D points.

13. The vehicle of claim 12, further comprising:

the vehicle including an autonomic vehicle control system capable of autonomously controlling one of a steering system, an acceleration system, or a braking system;

wherein the autonomic vehicle control system controls one of the steering system, the acceleration system, or the braking system based upon the presence of the curb in the FOV.

14. The vehicle of claim 12, wherein the image comprises a 2D fish-eye image.

15. The vehicle of claim 14, wherein the instruction set is executable to recover the plurality of three-dimensional (3D) points from the 2D fish-eye image from the image employing a structural from motion analysis.

16. The vehicle of claim 12, wherein the instruction set is executable to determine a ground plane normal vector for the image.

17. A vehicle, comprising:

a spatial monitoring system including a light detection and ranging (LiDAR) device and a controller, the LiDAR device arranged to capture data representing a forward field of view (FOV), a rearward FOV, a leftward FOV, and a rightward FOV;

the controller including an instruction set that is executable to:

capture a plurality of images from the LiDAR device;

determine a left image, a front image, and a right image based upon the plurality of images from the LiDAR device;

determine a left ground plane normal vector for the left image, a center ground plane normal vector from the front image, and right ground plane normal vector from the right image based upon the plurality of images from the LiDAR device;

determine a first angle difference between the left ground plane normal vector and the center ground plane normal vector;

determine a second angle difference between the right ground plane normal vector and the center ground plane normal vector;

detect an uneven ground surface based upon one of the first angle difference or the second angle difference;

determine an alignment compensation factor based upon the uneven ground surface; and generate a bird's eye view image based upon the alignment compensation factor and the uneven ground surface.

18. The vehicle of claim 17, further comprising:

the vehicle including an autonomic vehicle control system capable of autonomously controlling one of a steering system, an acceleration system, or a braking system;

wherein the autonomic vehicle control system controls one of the steering system, the acceleration system, or the braking system based upon the bird's eye view image.

19. The vehicle of claim 17, wherein the instruction set is executable to determine a ground plane normal vector for the left image, the front image, and the right image.

20. The vehicle of claim 17, further comprising the instruction set executable to:

determine a left ground plane normal vector for the left image based upon a near region of the plurality of 3D points from the left camera;

determine a distance to the left ground plane normal vector for each of the 3D points; and detect a presence of a curb in the leftward FOV based upon the distance to the left ground plane normal vector for each of the 3D points.

* * * * *